United States Patent
Holliday

[15] 3,653,361
[45] Apr. 4, 1972

[54] AUTOMATIC SELF-FILLING BIRD FEEDER

[72] Inventor: Don Holliday, 10323 Sierra Dawn Drive, Sylvania, Ohio 85351

[22] Filed: July 17, 1970

[21] Appl. No.: 55,892

[52] U.S. Cl. ....................................................119/52 AF
[51] Int. Cl. ........................................................A01k 39/00
[58] Field of Search ..................119/52 AF, 52 B, 51.11, 56; 222/66

[56] References Cited

UNITED STATES PATENTS

| | | |
|---|---|---|
| 1,892,790 | 1/1933 | Smelser................................222/66 X |
| 1,981,454 | 11/1934 | Kay.......................................222/66 X |
| 3,033,163 | 5/1962 | Hostetler et al. ...................119/52 AF |
| 3,168,888 | 2/1965 | Brodrick........................119/52 AF X |

*Primary Examiner*—Hugh R. Chamblee

[57] ABSTRACT

A feeding device for birds and the like in which a container has a large quantity of granular or pulverulent feed material which is elevated to a feeder by a screw conveyor operating in a tube. An electric motor operates the screw conveyor intermittently in response to a switch in the feeder, which is actuated by a pendulum-like arm swung by gravity when the feed supply is reduced or exhausted. A similar pendulum operated switch is in the container and is connected in the circuit with the other switch. It breaks the circuit when the supply of feed in the container is exhausted.

1 Claims, 1 Drawing Figure

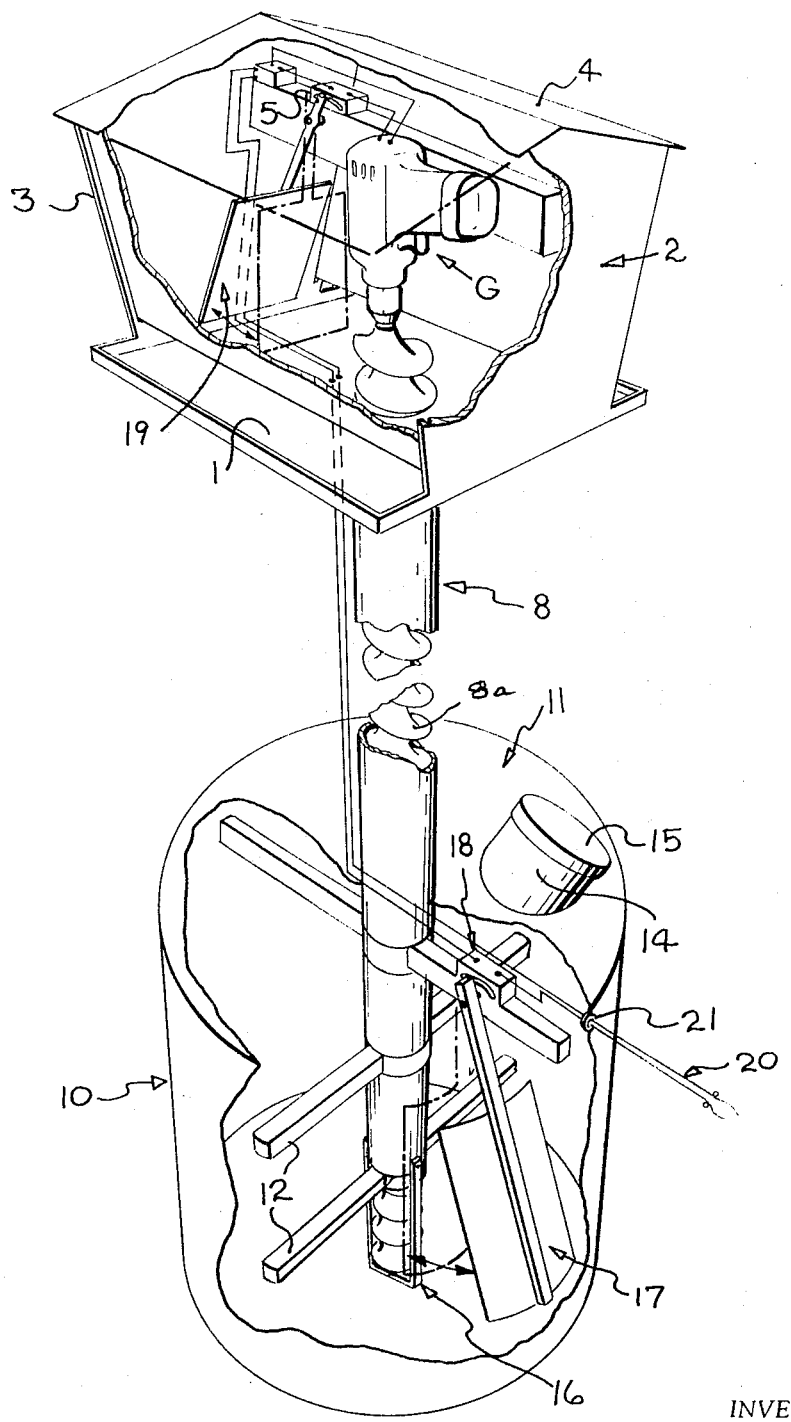

AUTOMATIC SELF-FILLING BIRD FEEDER

SUMMARY OF THE INVENTION

An automatic bird feeder which has a storage capacity for a large quantity of feed so that the feeder can supply feed over a long period of time without attention. The device is such that when the supply of feed at the feeder has been reduced, a conveyor is automatically energized to supply additional quantity. Provision is made to shut off the feed when the supply in the storage container is exhausted.

BRIEF DESCRIPTION OF THE DRAWING

The FIGURE is a top perspective view of a bird feeder and an automatic conveyor to the feeder from a storage tank, parts being broken away in the interest of clarity.

DESCRIPTION OF PREFERRED EMBODIMENT

This device will look like an ordinary bird feeder with a shingle roof 4, and glass sides 2 coming down to a feeding trough 1 where the feed will flow by gravity into the trough 1 from underneath the edge of the glass sides 2. This feeding box 3 will also have an automatic switch 5 and a motor 6 attached to the top of a screw conveyor 7 coming up from the ground through a pipe 8. This pipe will support the feeder and also act as part of the conveyor that will bring the seed up from the storage tank 10 buried in the ground underneath. When the feeder box 3 becomes full, the switch 5 automatically will stop the power to the motor 6, and the feeder box 3 will remain filled until the seed is dispensed underneath the glass sides 2 into the trough 1 for birds. There will also be in the feeder box 3, a mechanism something like a pendulum 13 that will swing and be on a hinge. This pendulum 13, as the feeder fills, will be forced back to the end of the feeder and will automatically snap a quick braking switch 5, which cuts off the power to the motor 6.

The underground storage tank 10 will consist in size of about 50 gallons. This will be buried under the ground approximately 1 foot with a cover 11, and extending upwardly out of this cover will be a funnel-type round piece of metal resembling a piece of stovepipe 14 with a cover on it and a handle 15. This cover 11 can be removed and the underground storage tank can be filled through the small opening of about 8 inches, so that the tank 10 will not be shown above the surface of the ground, only the filling part 14 will show. In this storage tank 10 there will be two 2-by-4 inch bars 12 crossways screwed in each side with lag screws and they will be separated about 1 foot from the bottom and 1 foot to the next bar 12, and perhaps a foot to the top of the tank. In these two 2-by-4 inch bars 12, each will have a hole in the middle sufficient in size to let the pipe 8 slide through to the bottom of the tank 10 for supporting the feeder box 3 above. This pipe will have been welded on the end that rests at the end of the storage tank. A U-shaped piece of metal 16 is used to keep the pipe about 2 inches from the bottom of the storage tank 10, and will allow grain or seed to flow in each side so that the screw conveyor 8a, which will be resting at the bottom of the tank inside of the pipe 8, will have an opportunity to pick up sufficient grain to carry up through the pipe 8 into the feeder box 3.

In this storage tank 10 there is also a paddle-like pendulum 17 consisting of a ¾ by ¾ inch board with a piece of metal, such as aluminum, nailed to it, approximately 8 inches wide and 1 and ½ feet high. This pendulum 17 will be mounted so that it will clear the bottom of the storage tank 10 by 2 inches or so, and will be allowed to freely swing when tank is empty. When it is filled with feed, it will force the pendulum 17 to the side of the tank 10 which, in turn, will activate an automatic self-braking switch 18 at the top of the pendulum 17, which will let the current continue from there up to the feeder box 3 that will be mounted on top of the pipe.

If the feeder box 3 at the top is empty, the pendulum 19 in that box 3 will swing back to a natural position, turning on the switch 5 to energize the motor 6. That will automatically start the motor 6 in the top and propel the screw conveyor 8a to pull up feed or seed from the storage tank 10 into the feeder box 3. When this feeder is not filled, but enough seen is sufficient to flow out into the trouch 1, the pendulum 19 will fall back to a natural position by gravity and will trip the quick-braking automatic switch 5 and automatically turn on the power motor 6 in the top to start the screw conveyor 8a in operation, which will bring up more feed. This will eliminate filling the feeder very often, such as in bad weather when the birds need the most attention. When the snow is heavy on the ground and the weather is cold, we sometimes neglect to fill these feeders and this invention will take care of that situation because the storage tank will hold approximately 800 pounds of feed, which will normally take care of several months of feeding birds in the worst part of the season.

The power for this unit should come from the nearest point of 110 volt circuit through an underground cable 20 to the storage tank, where it would enter through the side about 18 inches deep. At the point of entry into the tank 10, the cable is protected by a waterproof mechanism. From here the cable extends to the automatic switch 18 in the storage tank, one wire going through the switch 18, then both continue up the side of the conveyor pole or pipe 8 into the switch 19 that is in the feeder box.

I claim:

1. An automatic feeder comprising a storage receptacle for granular feed, said receptacle comprising a drum sunk in the ground; a cover for said drum having a filler opening; an automatic feeder device comprising a switch mechanism in said storage receptacle and means to activate said switch mechanism to enable current to pass to said switch mechanism when a supply of feed is in said receptacle but to prevent the passage of current in the absence of feed therein; a feed-receiving trough spaced from said receptacle and disposed substantially above the ground; means to deliver feed from said receptacle to said trough comprising an electric motor operatively connected to drive said automatic feeder device, said automatic switch means controlling said motor to energize said motor in response to lack of feed in said trough and to de-energize said motor after a supply of feed is delivered thereto.

* * * * *